Nov. 27, 1923.
G. C. DAVISON
TRACTOR WHEEL
Filed Sept. 6, 1919
1,475,544
3 Sheets-Sheet 1
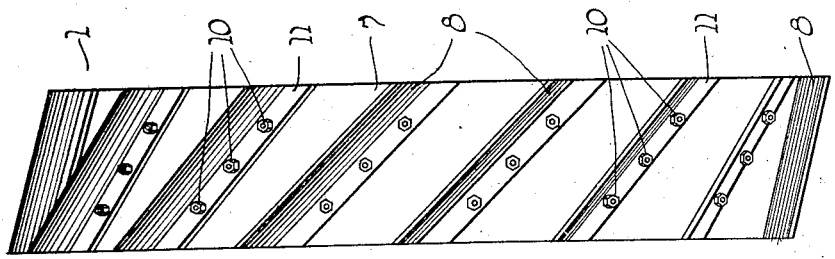
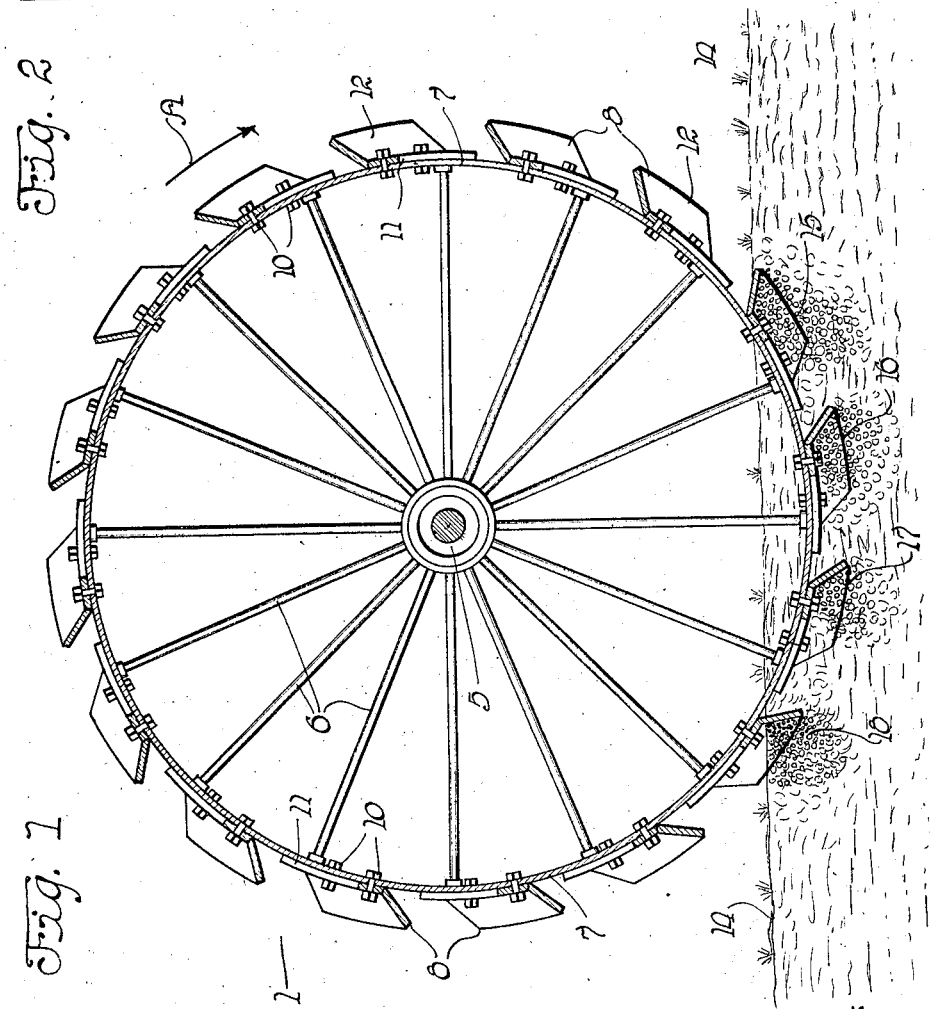
Inventor
Gregory C. Davison
By Brown, Boettcher & Siemer
Attorneys Nov. 27, 1923.

G. C. DAVISON 1,475,544

TRACTOR WHEEL

Filed Sept. 6, 1919    3 Sheets-Sheet 2

Inventor
Gregory C. Davison
By Brown, Boettcher & Kiemer
Attorneys

Nov. 27, 1923.
G. C. DAVISON
TRACTOR WHEEL
Filed Sept. 6, 1919
1,475,544
3 Sheets-Sheet 3
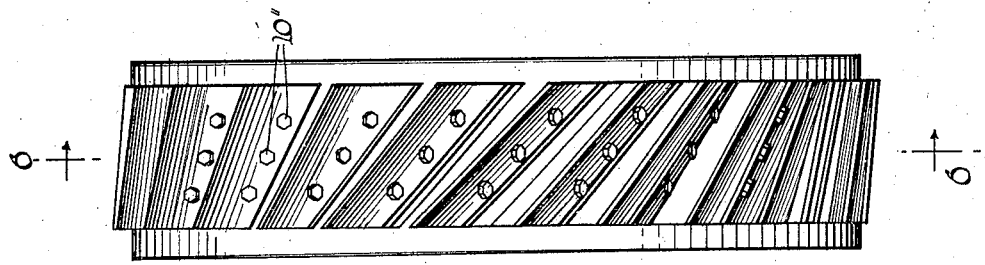
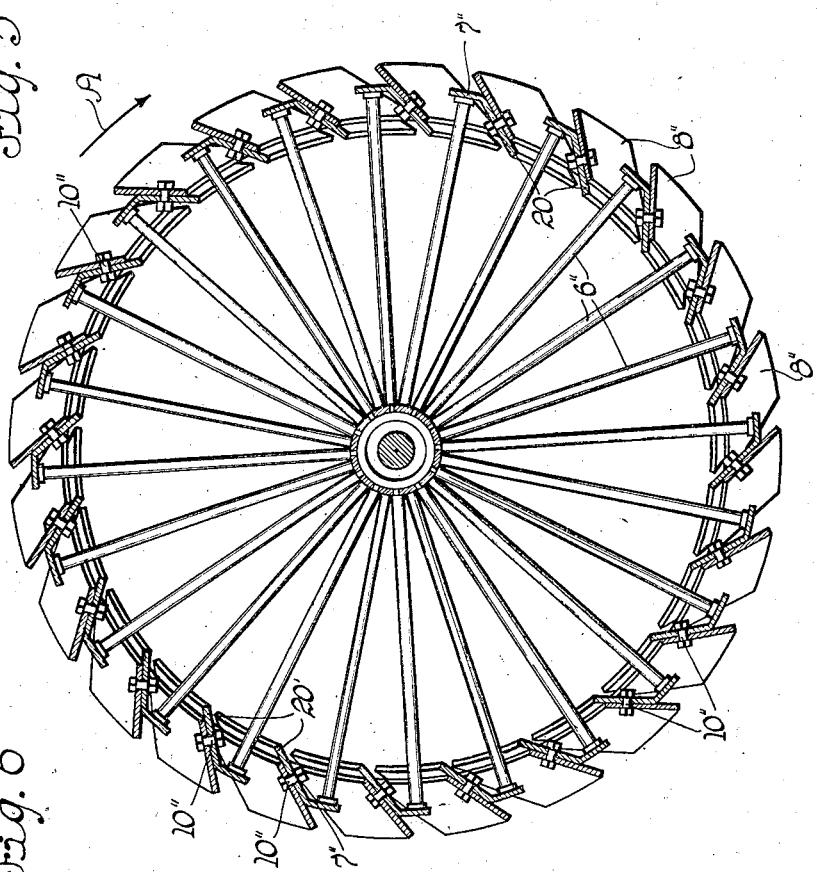
Inventor
Gregory C. Davison
By Crown, Boettcher & Kliemer
Attorneys Patented Nov. 27, 1923.

1,475,544

UNITED STATES PATENT OFFICE.

GREGORY C. DAVISON, OF NEW LONDON, CONNECTICUT.

TRACTOR WHEEL.

Application filed September 6, 1919. Serial No. 322,087.

*To all whom it may concern:*

Be it known that I, GREGORY C. DAVISON, a citizen of the United States, residing at New London, in the county of New London and State of Connecticut, have invented a certain new and useful Improvement in Tractor Wheels, of which the following is a full, clear, concise, and exact description, reference being had to the accompanying drawings, forming a part of this specification.

My invention relates to improvements in wheels and is concerned particularly with the driving or traction wheels employed in connection with various types of motor driven vehicles. While my invention is particularly adapted for use in connection with vehicles of the traction engine or tractor type, I do not intend to limit the invention to such use or purpose only.

In wheels of this general description, considerable difficulty has been experienced in insuring proper traction, particularly on soft ground or under a relatively heavy load. Attempts to overcome such difficulties have resulted in the attachment of various types of traction elements such as spikes, lugs, cones, ribs, etc., to the periphery of the wheel and in the development of wheels of the "walking shoe" type wherein tread plates are arranged in connection with the wheel so as to be successively placed upon the ground.

The wheels of the prior art having traction elements attached to their peripheries have not proven satisfactory, in that the traction elements have, upon passing a vertical plane thru the axis of the wheel, forced the ground upwardly much as a scraper or digger. I have found that when the ground is too soft or sandy or the load is too great the wheel slips and this digging action of the traction elements forms a hole in which the wheel is gradually buried as it continues to rotate without moving forward. Wheels of the so-called "walking shoe" type are not only complicated, but are unreliable in that the various pivoted or cushioned joints, springs, etc., thereof soon become clogged up with loose dirt, clay and the like and fail to operate properly, and their action, being step by step, lacks evenness and uniformity.

My invention aims to provide a wheel of the simplest construction consistent with strength and durability wherein the tractive efficiency is maintained at a maximum whether on hard or soft ground and accordingly I have provided a wheel wherein the advantages of the wheel having projecting lugs attached to its periphery are combined with the advantages of the "walking shoe" type of wheel without the disadvantages of either.

Theoretically the principle of operation involved in a wheel constructed in accordance with the teachings of my invention is much the same as the action of a horse's hoof when walking or running; namely, the ground, regardless as to how soft or sandy it is, will be packed beneath the traction elements of the wheel during their entire period of co-operation therewith. Upon passing a vertical plane thru the axis of the wheel, a downward and backward force is exerted by these traction elements instead of the upward digging action of the prior art, and consequently slipping is effectively prevented and positive traction is assured.

In order that those skilled in the art may be fully acquainted with the nature and scope of my invention, I shall describe a specific embodiment of the invention in connection with the accompanying drawings, which form a part of the present specification and wherein:

Figure 1 is a vertical sectional view of a wheel embodying my invention, taken at right angles to the axis of rotation of the wheel;

Figure 2 is a front elevational view of the same;

Figure 5 is a front elevational view of a wheel showing still another form of construction embodying my invention; and Figure 6 is a vertical sectional view taken on the line 6—6 of Figure 5.

Figure 3:
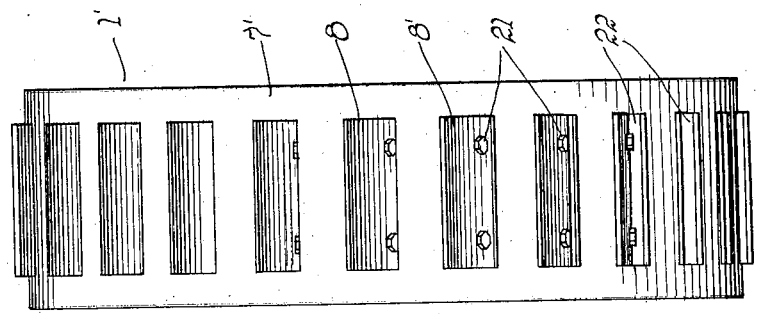
Figure 3 is a side elevational view of a wheel showing an alternative form of construction embodying my invention.

Referring first to Figures 1 and 2 of the drawings, the traction wheel 1 comprises a hub 5 having the usual spokes 6 radiating therefrom and connected at their outer ends to a rim 7. It is to be understood that the particular formation of the wheel 1 is immaterial in so far as my invention is concerned. For example, the rim 7 may be attached to the hub 5 thru a disk or web instead of the spokes 6 if so desired.

In this particular embodiment of my invention the tread plates or blades 8 provided in conjunction with the rim 7 comprise angle irons secured in spaced relation about the periphery of the rim by means of suitable bolts 10, the shanks of which bolts extend thru the rim-engaging flanges 11 of the tread plates or blades 8 and the rim 7 of the wheel and co-operate with suitable nuts. I have shown the tread plates 8 as arranged at an angle across the periphery of the cylindrical rim 7, as a preferred arrangement, this plan being calculated and having been proven to be effective in securing even and uniform action. These blades may, however, without departing from the broader spirit of my invention, be arranged across the rim 7 parallel with the axis of rotation of the wheel if so desired. The tread plates 8 may be cast integral with the rim 7 or as an integral annular ring adapted for mounting upon the rim 7, if so desired. In any event, the tread plates 8 are maintained rigidly in position and the outwardly extending flanges 12 thereof normally project from the periphery of the wheel 1.

It is to be noted that the outwardly extending flanges 12 of the tread plates 8 do not project radially from the rim 7, but are arranged at an angle to the radius of the wheel. This inclination of the flanges 12 need not be precisely that shown, but may be varied; in fact this angle of inclination may be varied to suit the particular conditions under which the wheel is to be used.

In driving a vehicle the direction of rotation of the wheel 1 is as indicated by the arrow A and the operation is as follows: The tread plates or blades 8 are brought successively into contact with the ground 14 in a manner similar to the operation of a horse's hoof. As the wheel continues to rotate, the ground is packed before the impact of the respective outwardly extending flanges 12 of these blades, as clearly shown in Figure 1 at 15, 16, 17 and 18. It is to be noted that the downward and backward push of the flanges 12 upon coming into contact with the ground continues until these flanges subsequently leave the ground. The pressure is at all times in a downward and backward direction and at no point is the ground forced upwardly as heretofore. Consequently there is no tendency to grind, dig, or to convey the soil up and to the rear of the wheel as has been customary heretofore in the art. The advantages of the "walking shoe" type of tread and the wheel having projecting lugs mounted upon its periphery are thereby combined without the disadvantages of either; namely, without the grinding or digging action of the usual traction lugs and without the complexity and unreliability of the "walking shoe" type of tread.

Figure 4:
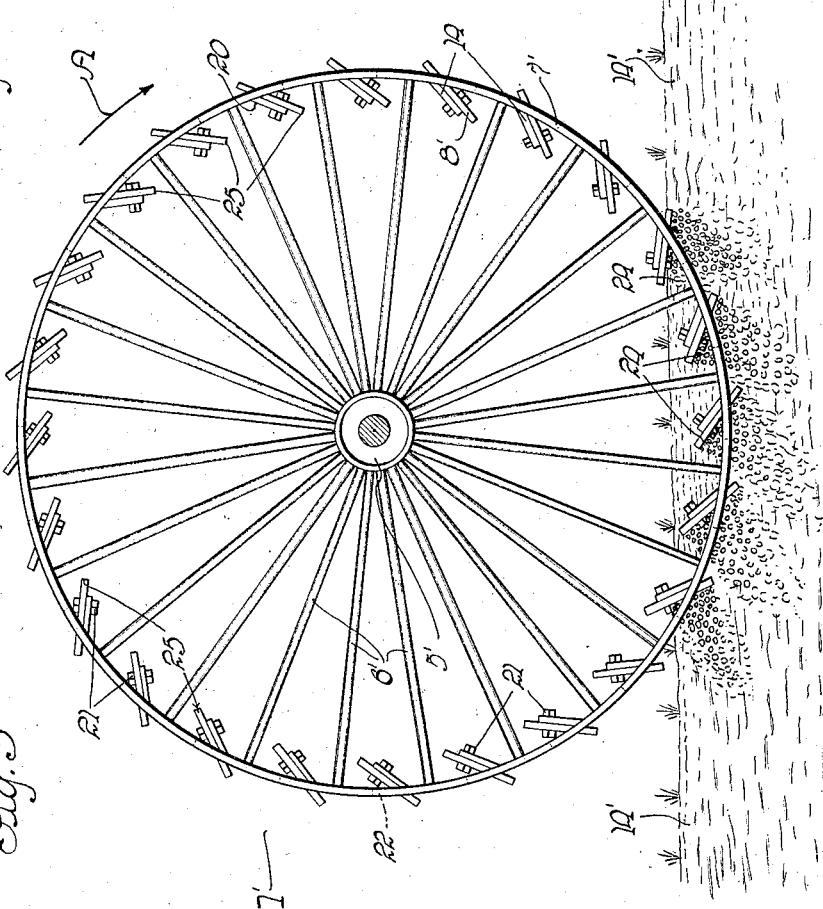
Figure 4 is a front elevational view of the same.

In Figures 3 and 4 I have illustrated an alternative form of construction embodying my invention. In this instance a series of mounting plates or blades 20 are stamped out of the rim 7' of the wheel at spaced intervals about the periphery thereof. These mounting blades are then bent inwardly to the desired angle of inclination to the radius of the wheel. The tread plates or blades 8' which are then secured to these inwardly projecting mounting plates 20 as by means of suitable bolts 21, project thru the openings 22 provided in the rim 7' by stamping the mounting plates 20 therefrom and from the periphery of the rim at an angle to the radius of the wheel substantially as in the form shown in Figures 1 and 2. The operation of the tread plates 8' of this form of my invention is substantially the same as that explained in connection with the tread plates 8 of Figures 1 and 2. In addition, the pressure of the wheel 1' upon the ground 14 will force the soil thru the openings 22 in the periphery of the wheel, bringing a greater effective area of tread plate or blade into action as clearly shown at 24.

Furthermore the openings 22 thus provided in the periphery of the wheel allow particles of the soil to escape from between the tread plates thereby preventing the effective area of the tread plates from becoming clogged with dirt, clay and the like, as has been a considerable practical difficulty heretofore.

In the event that it is desired to use this type of wheel on the road, the tread plates 8' may be provided with such bolt openings as to allow these plates to be withdrawn within the rim of the wheel, from their effective projecting position, and securely bolted in such withdrawn position. The length of plate projecting from the rim 7' may also be varied in this manner to suit various conditions. In fact I contemplate the provision of suitable pads on the inner edges 25 of the tread plates 8', whereupon, for road use the tread plates can be reversed and securely bolted to the mounting plates 20 in such reversed position, giving an admirable tread surface for use on a highway.

In the form of construction shown in Figures 5 and 6 the mounting plates or blades 20' are stamped out of the rim 7" at an angle across the periphery thereof, instead of strictly longitudinal thereof, as shown in Figures 3 and 4. Consequently the tread plates or blades 8", which are bolted to these mounting plates 20' by means of suitable bolts 10", are arranged at an angle across the periphery of the rim 7" instead of parallel with the axis of rotation of the wheel, giving a considerably greater area of effective tread plate for a rim of the same width.

The provision of a wheel having the advantages of the "walking shoe" type of tread together with the advantages of the usual projecting traction lugs without the disadvantages of either, is a highly important aspect of my invention.

I do not intend to limit the invention to the particular details shown, as I am aware and contemplate that modifications and changes may be made without departing from the invention which is set out in the appended claims.

I claim:

1. In a wheel of the class described, a rim having a series of circumferentially arranged transversely extending openings, and a series of transversely extending tread members rigidly attached to the rim and projecting through said openings outwardly from the rim.

2. In a wheel of the class described, a rim having a series of circumferentially arranged openings, a series of mounting flanges carried by and projecting inwardly from the rim adjacent said openings and a series of tread members carried by said inwardly projecting mounting flanges and projecting through said openings outwardly from the rim.

3. In a wheel of the class described, a relatively wide band forming a rim, a series of mounting pieces stamped from said band and projecting inwardly therefrom, and a series of tread members secured to said inwardly projecting mounting pieces and adapted to project through openings provided in the rim by the stamping of said mounting pieces therefrom.

In witness whereof I hereunto subscribe my name this 29th day of August, 1919.

GREGORY C. DAVISON.